United States Patent
Calder et al.

(10) Patent No.: US 10,536,523 B2
(45) Date of Patent: Jan. 14, 2020

(54) FILE SERVICE USING A SHARED FILE ACCESS-REST INTERFACE

(71) Applicant: MICROSOFT TECHNOLOGY LICENSING, LLC, Redmond, WA (US)

(72) Inventors: Bradley Gene Calder, Bellevue, WA (US); Jean Ghanem, Redmond, WA (US); Andrew James Edwards, Bellevue, WA (US); Ishai Ben Aroya, Seattle, WA (US); David Allen Goebel, Vashon, WA (US); Jiesheng Wu, Redmond, WA (US); Jaidev Haridas, Redmond, WA (US); Shuvabrata Ganguly, Seattle, WA (US); Matthew Douglas Hendel, Seattle, WA (US); Ozan Demir, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 536 days.

(21) Appl. No.: 14/708,286

(22) Filed: May 10, 2015

(65) Prior Publication Data

US 2015/0324386 A1  Nov. 12, 2015

Related U.S. Application Data

(60) Provisional application No. 61/991,579, filed on May 11, 2014.

(51) Int. Cl.
  *G06F 17/30*  (2006.01)
  *H04L 29/08*  (2006.01)
  (Continued)

(52) U.S. Cl.
  CPC ...... *H04L 67/1097* (2013.01); *G06F 11/1464* (2013.01); *G06F 16/1774* (2019.01);
  (Continued)

(58) Field of Classification Search
  CPC ......... G06F 17/30165; G06F 17/30876; G06F 17/30194; G06F 17/30171; G06F 11/1464;
  (Continued)

(56) References Cited

U.S. PATENT DOCUMENTS 6,385,701 B1 * 5/2002 Krein .................. G06F 12/0815
                                              707/999.008
7,930,275 B2  4/2011 Chen et al.
(Continued)

FOREIGN PATENT DOCUMENTS

CN  101459651 A  6/2009
CN  103399899 A  11/2013
(Continued)

OTHER PUBLICATIONS

Tancock, et al., "A Privacy Impact Assessment Tool for Cloud Computing", In IEEE Second International Conference on Cloud Computing Technology and Science, Nov. 30, 2010, pp. 667-676.
(Continued)

*Primary Examiner* — Pierre M Vital
*Assistant Examiner* — Andalib F Lodhi
(74) *Attorney, Agent, or Firm* — Shook, Hardy & Bacon, L.L.P.

(57) ABSTRACT

In various embodiments, methods and systems for providing access to file systems are provided. An SFA-based operation having an operation modifier for a file in a file system is received. The SFA-based operation is defined based on a file-representational state transfer (REST) interface. The SFA-REST interface comprises integrated functionality of
(Continued)

an SFA protocol and REST protocol. The SFA-based operation is executed using the operation modifier. A REST-based operation for the file in the distributed file storage is received. The REST-based operation is defined based on the SFA-REST interface. The operation modifier is referenced in order to execute the REST-based operation. The REST-based operation based on the SFA-REST interface. A schema can be implemented for accessing the file system. The schema includes tables to store files, the table comprises fields corresponding to elements of a SFA-REST interface. A snapshot component can be implemented to backup file shares in the file system.

40 Claims, 9 Drawing Sheets

(51) Int. Cl.
*G06F 11/14* (2006.01)
*G06F 16/955* (2019.01)
*G06F 16/176* (2019.01)
*G06F 16/182* (2019.01)

(52) U.S. Cl.
CPC .......... *G06F 16/955* (2019.01); *G06F 16/182* (2019.01); *G06F 2201/84* (2013.01)

(58) Field of Classification Search
CPC .............. G06F 2201/84; G06F 16/176; G06F 16/1774; G06F 16/955; G06F 16/182; G06F 16/00; H04L 29/06068; H04L 67/1097; H04L 69/08
USPC ......................................................... 707/649
See application file for complete search history.

(56) References Cited

U.S. PATENT DOCUMENTS

| | | |
|---|---|---|
| 8,069,149 B1 | 11/2011 | Chen et al. |
| 8,099,572 B1 | 1/2012 | Arora et al. |
| 8,301,608 B1 | 10/2012 | Mesropian et al. |
| 8,527,561 B1 | 9/2013 | Moody et al. |
| 8,626,713 B2 | 1/2014 | Adkins et al. |
| 2001/0044807 A1 | 11/2001 | Kleiman et al. |
| 2009/0327360 A1 | 12/2009 | Rajaram et al. |
| 2011/0313973 A1 | 12/2011 | Srivas et al. |
| 2012/0089569 A1* | 4/2012 | Mason, Jr. ........ G06F 17/30171 707/639 |
| 2012/0303585 A1 | 11/2012 | Zuckerman et al. |
| 2013/0036272 A1* | 2/2013 | Nelson ................ H04L 67/1097 711/147 |
| 2013/0159530 A1* | 6/2013 | James ............... G06F 17/30887 709/226 |

FOREIGN PATENT DOCUMENTS

| | | |
|---|---|---|
| JP | 2008004120 A | 1/2008 |
| JP | 2008305405 A | 12/2008 |
| RU | 2449358 C1 | 4/2012 |

OTHER PUBLICATIONS

Hongwei, Sun, "Client caching features: *Oplock* vs. *Lease*—Microsoft Open Specifications Support Team Blog", Published on: May 22, 2009 Available at: http://web.archive.org/web/20140507095143/http://blogs.msdn.com/b/openspecification/archive/2009/05/22/client-caching-features-oplock-vs-lease.aspx.
"International Search Report & Written Opinion Issued in PCT Application No. PCT/US2015/030165", dated Aug. 19, 2015, 11 Pages.
Stender, Jan, "Snapshots in Large-Scale Distributed File Systems", In Doctoral Dissertation, Retrieved on: Apr. 29, 2014, 139 pages.
"Windows Azure Storage", Retrieved on: Apr. 29, 2014 Available at: www.cs.tau.ac.il/~hillelav/courses/p2c . . . /TAU-WindowsAzureStorage.ppt.
Soares, et al., "Meta-data Snapshotting: A Simple Mechanism for File System Consistency", In Proceedings of the International Workshop on Storage Network Architecture and Parallel I/Os, Sep. 28, 2003, pp. 1-12.
"Office Action Issued in European Patent Application No. 15726781. 6", dated Aug. 14, 2018, 11 Pages.
"Office Action Issued in Mexican Patent Application No. Mx/a/2016/014641", dated Jun. 19, 2018, 7 Pages.
"Office Action Issued in Russian Patent Application No. 2016144155", dated Nov. 7, 2018,11 Pages.
"Office Action Issued in Chinese Patent Application No. 201580024724. 2", dated Feb. 28, 2019, 12 Pages.
"Office Action Issued in Japanese Patent Application No. 2016-567687", dated Mar. 18, 2019, 7 Pages.

\* cited by examiner

FILE SERVICE USING A SHARED FILE ACCESS-REST INTERFACE

CROSS-REFERENCE TO RELATED APPLICATIONS

This application claims priority to U.S. Provisional Application Ser. No. 61/991,579, filed May 11, 2013, entitled "FILE SERVICE USING A SHARED FILE ACCESS-REST INTERFACE," which is incorporated herein by reference in its entirety.

BACKGROUND

Data access is facilitated by several different types of data access protocols. Data access protocols provide rules for data communication inside of or between computers. The different types of data access protocols provide certain advantages in accessing data. In particular, a shared file access ("SFA") protocol, such as, Server Message Block ("SMB") protocol, can be used to access file system resources and Representation State Transfer ("REST") protocol can also be used for client server interactions limited by defined architectural constraints. Each protocol is a well-defined format for communicating messages to access data. Thus, when the protocols are implemented as Application Programming Interfaces (APIs) to link to data access services, the API libraries of one protocol unavoidably functions at the exclusion of other protocol APIs. In this regard, conventional data access protocols and APIs are not effective in facilitating an integrated file sharing and constraint-based client server interaction because conventional data access protocols and APIs fail to provide comprehensive support for integrated SMB and REST functionality.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

In various embodiments, methods and systems for providing access to file systems are provided. An SFA-based operation having an operation modifier for a file in a file system is received. The SFA-based operation is defined based on a file-representational state transfer (REST) interface. The SFA-REST interface comprises integrated functionality of an SFA protocol and REST protocol. A REST-based operation for the file in the distributed file storage is received. The REST-based operation is defined based on the SFA-REST interface. The SFA-based operation is executed using the operation modifier. The operation modifier is referenced in order to execute the REST-based operation. The REST-based operation is executed based on the SFA-REST interface. A file schema can be implemented for accessing the file system. The schema includes tables to store files, the tables comprise fields corresponding to elements of an SFA-REST interface. It is further contemplated that a snapshot component can be implemented to backup file shares in the file system.

BRIEF DESCRIPTION OF THE DRAWINGS

The present invention is described in detail below with reference to the attached drawing figures, wherein.

DETAILED DESCRIPTION

Figure 1:
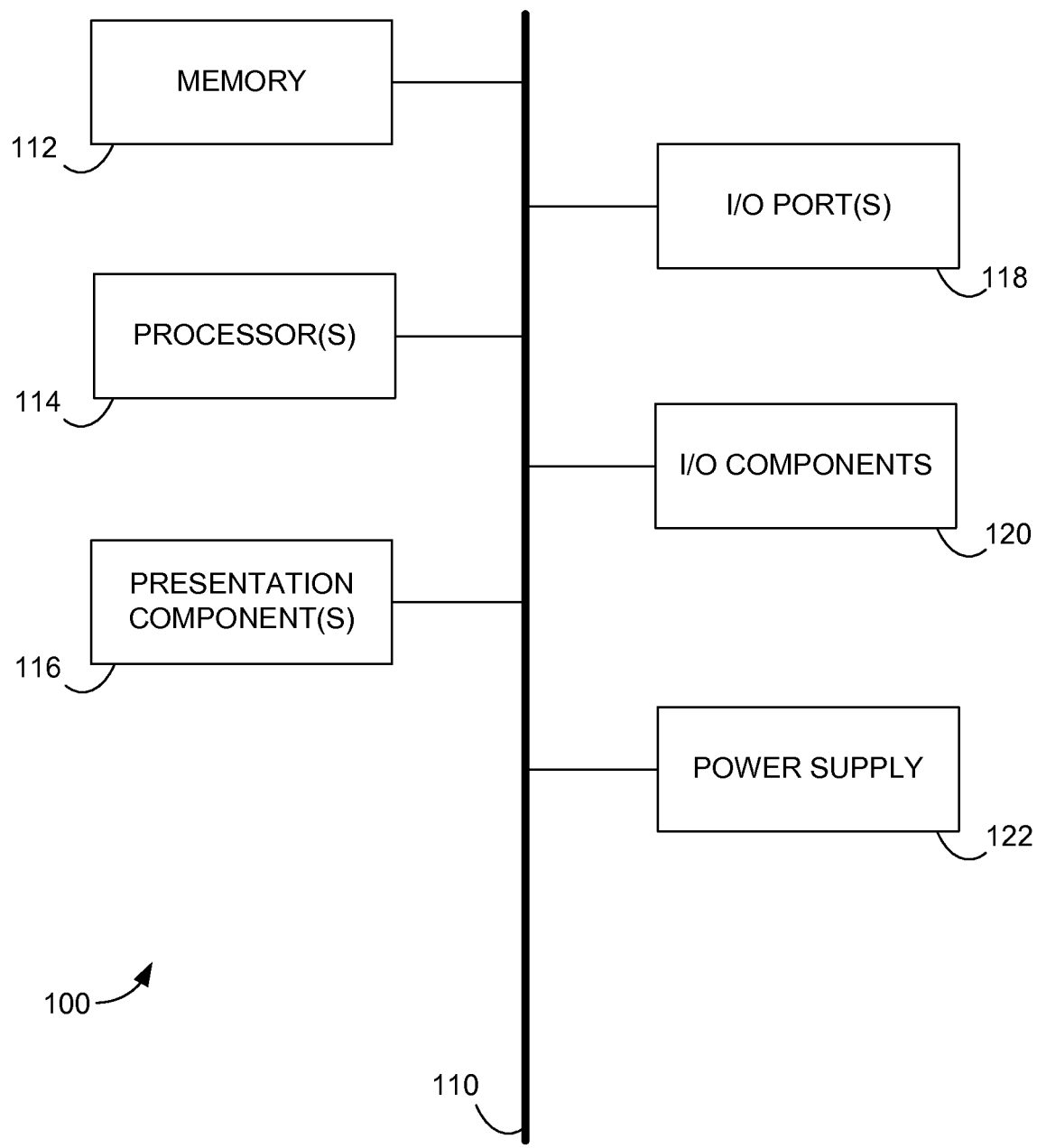
FIG. 1 is a block diagram of an exemplary computing environment suitable for use in implementing embodiments of the present invention.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising." In addition, words such as "a" and "an," unless otherwise indicated to the contrary, include the plural as well as the singular. Thus, for example, the requirement of "a feature" is satisfied where one or more features are present. Also, the term "or" includes the conjunctive, the disjunctive and both (a or b thus includes either a or b, as well as a and b).

For purposes of a detailed discussion below, embodiments of the present invention are described with reference to SFA-based operations using SFA and REST-based operations via HTTP, interacting to support a file service on a cloud computing platform; however the sharing of content via an SFA-REST interface for the file service on the cloud computing platform is merely exemplary and it is contemplated that the techniques described may be extended to other implementation contexts that where SFA-based operations and REST-based operation interact.

A shared file access protocol is used for providing shared access to files, printers, serial port and communications between nodes on a network. In particular, the shared file access protocol allows a client to manipulate files just as if they were on the local computer. Operations such as read, write, create, delete are all supported, the only difference being that the files are not local to the computing device but actually on a remote server.

Shared file access protocol implementations work through a client-server approach, where a client makes specific requests and the server responds accordingly. In particular, the SMB protocol provides for file system access such that clients may make requests to a file server. By way of background, a file system is used to control how data is stored and retrieved such that one piece of information in the file system storage may be differentiated from another. The structure and logic rules used to manage data and their names is called a file system. SMB servers make their file systems and other resources available to clients on the network. As such, the SMB protocol is a preferred file share protocol.

Representational state transfer ("REST") refers to a software architectural style consisting of a coordinated set of architectural constraints applied to components, connectors, and data elements with a distributed hypermedia system. In this regard, the REST protocol may be described as an architectural constraints protocol. Formal REST architectural constraints include client-server, stateless, cacheable, self-descriptive messages, and manipulation of resources through representations, amongst others. In particular, statelessness may refer to the notion that client-server communication is constrained by no client context being stored on the server between requests or there may be not state maintained at all in the client between requests. Each request from any client contains all the information necessary to service the request, and session state is held in the client. REST may also be configured to run over Hypertext Transfer Protocol ("HTTP"). For example, a designated Web page that contains an Extensible Markup Language ("XML") file may be read, with the XML describing and having the desired content. REST protocol implemented as APIs may be used in mobile applications, social networking Web sites, and automated business processes. The REST style emphasizes that interactions between clients and services is enhanced by having a limited number of operations. Resources may be assigned their own unique universal resource identifiers ("URIs").

A computing platform may generally refer to an existing environment having pieces of software designed to run within the platform, obey constraints, and make use of the platform facilities. The platform includes hardware architecture and a software framework, where the combination can allow clients and servers to communicate using a data access protocol. Typical platforms include hardware architecture, an operating system, and runtime libraries. The hardware architecture refers to identification of physical components and interrelationships and the software framework refers to an abstraction in which software providing generic functionality. In particular, a software framework (e.g., REST APIs) can enable access to blobs in a blob storage. In this regard, for example, customers may access data (e.g., blob data) blob storage for applications on a dedicated platform infrastructure. The platform may be implemented as a computing platform in a distributed cloud computing infrastructure.

Typically, a cloud computing platform acts to store data or run service applications in a distributed manner. A computing platform may span across wide geographic locations, including countries and continents. The cloud computing platform can be a public cloud that provides different types of services including compute services (e.g., virtual machines, web sites, cloud services, and mobile services), data services (e.g., storage, SQL databases, SQL reporting, tables, backup, and recovery), networking services (e.g., virtual network, traffic manager, data transfer) and application services (e.g., media services, service bus, notification hubs, and multi-factor authentication). For example, the cloud computing platform provides for running service applications and storing data on machines in an internet-accessible datacenter.

The cloud computing platform components (e.g., a fabric controller) are further responsible for various duties surrounding the monitoring, maintenance, and management of the health of computer resources, network gear, serial devices, and power units that support the underlying functionality of the fabric. Various differing types of cloud configurations may be implemented with embodiments of the present invention, thus it should be understood and appreciated by those of ordinary skill in the art that suitable structures of cloud computing platform may be used, and that embodiments of the present invention are not limited to those described herein.

A platform can support services that support access to data. Data access is facilitated by several different types of data access protocols. Data access protocols provide rules for data communication within or between computers. The different types of data access protocols provide certain advantages in accessing data. In particular, the SMB protocol is the preferred file share protocol and REST protocol is frequently used for constraint-based client server interactions. Each protocol is a well-defined format for communicating messages to access data. Thus, when the protocols are implemented as Application Programming Interfaces (APIs) to link to data access services, the API libraries of one protocol unavoidably functions at the exclusion of other protocol APIs. In this regard, conventional data access protocols and APIs are not effective in facilitating an integrated file sharing and constraint-based client server interaction because conventional data access protocols and APIs fail to provide comprehensive support for integrated SMB and REST functionality. In addition, traditional file system access is based on Direct Attached Storage ("DAS") and Storage Area Network ("SAN") solutions which are often complex and expensive to install, configure, and operate. At a basic level, today, no cloud-based platform is available to support a file service that provides SFA-REST APIs ("SFA-REST interface") based on a shared file access protocol and REST protocol to access a file system. A file service on a cloud computing platform can provide comprehensive support for parallel access to file system from clients while leveraging the availability and scalability of the cloud computing infrastructure supporting the platform.

Accordingly, embodiments of the present invention provide simple and efficient cloud computing platform file service, and methods for accessing files based on the file service, where the file service comprises a SFA-REST interface. In particular, SFA-REST interface components that are defined herein broadly to refer to an integrated implementation of the functionality of SFA protocol and REST protocol. In this regard, the SFA-REST interface supports SFA-based operations to access a file share, the SFA-REST interface is based at least in part on implementing elements of the SFA protocol. The SFA-REST interface further supports REST-based operations to access a file share, the SFA-REST interface is based at least in part on implementing elements of the REST protocol. The SFA-REST interface may further be implemented on a platform in a cloud computing infrastructure that provides virtual machines, storage, load balancing, and networking for a file service that provides access to shared files. The cloud computing infrastructure may independently support the file service, however in embodiments, a blob service may run in parallel with the file service. The file service and the blob service can both leverage features available in the cloud computing infrastructure.

An exemplary implementation of the SFA-REST interface supporting integrated functionality can be illustrated with a cache component of the SFA-REST interface. The cache component will further be discussed in more detail below. The cache component can facilitate determining how much content of a file service resource (e.g., file or directory) can be cached on a client. SFA-based caching of file may be referred to as an SMB lease which is different from the REST lease. Features of the REST lease are also discussed in more detail below. With continued reference to an SMB lease, by way of example, when an SFA client opens a file, the SFA client can request a maximum amount of caching (e.g., read, write, handle). The SFA client may communicate an SFA-based operation having an operation modifier that requests caching. Based on the type and number of other handles open to that file, the file service can respond to the client with a determination of whether read, writes, or even calls to close the handle or open more handle can be performed to the specified file. When the file is exclusively being accessed by a first client, the system can grant full caching (read, write, and handle). If a second client attempts to open a handle to that file, the system may need to break the SMB lease to ensure that changes made by the first client are visible to the second client. Breaking the SMB lease comprises communicating with the first client having the SMB lease to flush changes to the server before the SMB lease is broken. The cache component can also support breaking SMB-leases when REST-based operations (e.g., read or writes) are requested for a file under an SMB-lease.

A cache component of an SFA-REST interface can be configured to support error paths that are now possible because of the parallel access to the file system via an SFA client and a REST client. By way of example, a client that owns a lease may be unresponsive when an SMB lease needs to be broken. The SFA-REST interface can support managing the integrated functionality of the SFA-based operations and REST-based operations with reference to SMB leases on files. For example, a REST-based operation to read or write can request access for a file while the file is open and cached under an existing SMB lease. The file can be opened based on an SFA-based operation having an operation modifier that requests caching. In that case, the REST-based operation read or write can be blocked while the SMB leases are broken. It is contemplated that breaking the SMB leases may take some time. As such, the SFA-REST interface may provide for a timeout error in circumstances where the breaking the SMB leases has taken too long. A specific error code can be defined and returned to the client to allow the client to retry the REST-based operation (e.g., read or write) later. Any other variations and combinations of REST-based operations integrated by way of functionality with SFA-based operations supported via SFA-REST interface components are contemplated in the present invention.

Embodiments of the present invention further include a schema developed based on the SFA-REST interface components. The schema supports a file service that provides parallel SFA-based and REST-based access to file shares. For example, an SFA client and a REST client can both have access to a file share at the same time. The schema includes a plurality of tables, where the tables include fields based on the SFA-REST interface having elements of the SFA protocol and the REST protocol. The schema further enables snapshotting the file system. A snapshot backs up the file system. Snapshotting can be based on a copy-on-write type pattern such that old versions, at each snapshot, can be accessed at a later time.

Accordingly, in a first aspect of the present invention, method for accessing files in distributed file systems is provided. The method comprises receiving an SFA-based operation having an operation modifier for a file in a distributed file system. The SFA-based operation is defined based on a file-representational state transfer (REST) interface. The SFA-REST interface comprises integrated functionality of an SFA protocol and REST protocol. The method further comprises receiving a REST-based operation for the file in the distributed file system, the REST-based operation is defined based on the SFA-REST interface. The method also includes executing the SFA-based operation using the operation modifier. The method includes referencing the operation modifier to execute the REST-based operation. The method also includes executing the REST-based operation based on the SFA-REST interface.

In a second aspect of the present invention, a system having a file service schema for accessing data file systems is provided. The file service schema includes a plurality of tables. The plurality of tables stores the state of files in a file system. The plurality tables comprise fields corresponding to elements of a SFA-REST interface, The SFA-REST interface comprises integrated functionality of an SFA protocol and REST protocol for accessing files in the file system In a third aspect of the present invention, a computer-implemented method for snapshotting file shares is provided. The method includes updating a share table comprising a file share. Updating the share table comprises adding a row to the share table, the row associated with a new version of the file share. The method also includes communicating to a node associated with the file share a notification directing the node to start writing to the new version of the file share. The method further includes determining that the node is writing to the new version of the file share. The method also includes updating the share table to indicate that the snapshot completed successfully.

Having briefly described an overview of embodiments of the present invention, an exemplary operating environment in which embodiments of the present invention may be implemented is described below in order to provide a general context for various aspects of the present invention. Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 112 includes computer storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2A:
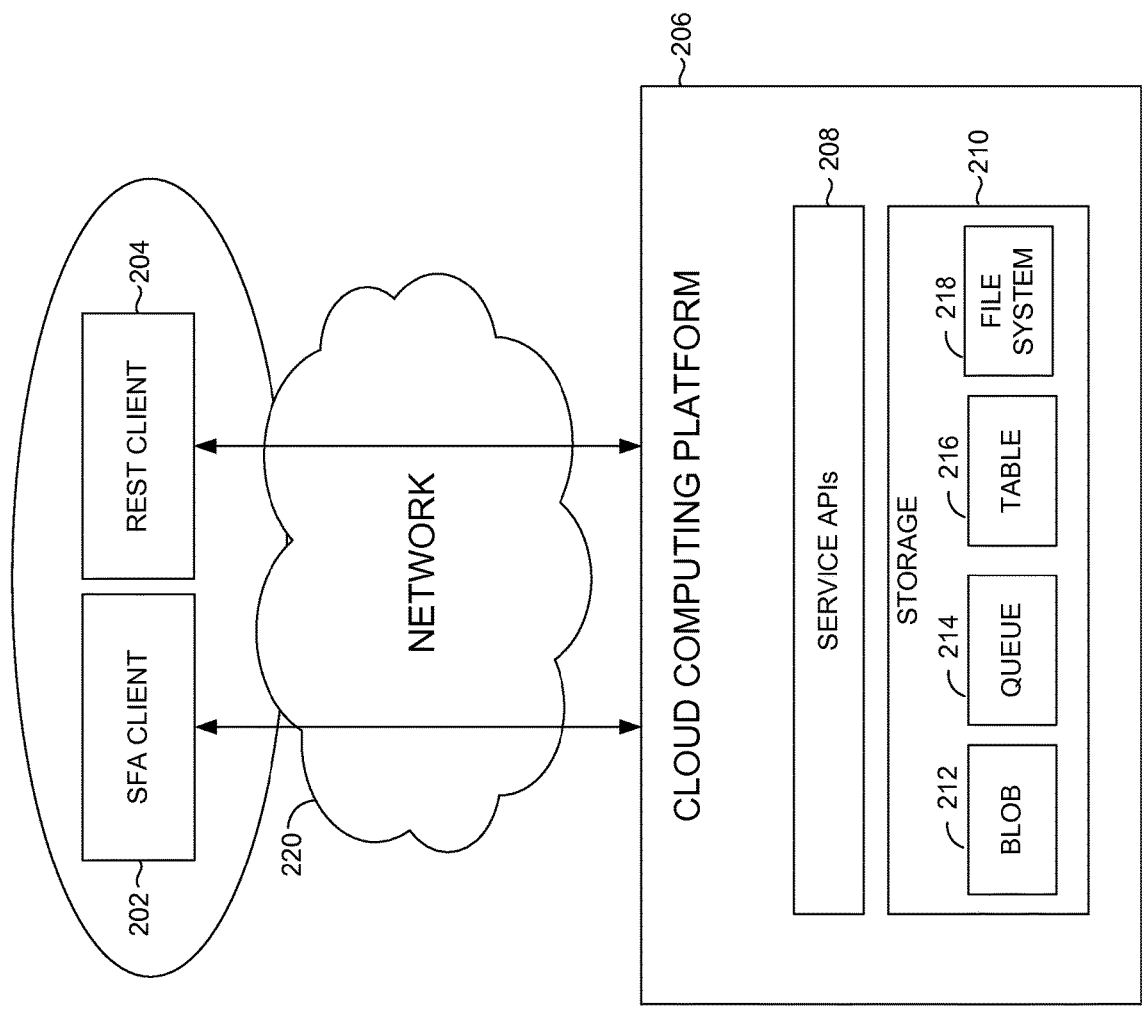
FIGS. 2A-D are block diagrams of an exemplary a cloud computing infrastructure and platform in which embodiments of the invention may be employed.

With reference to FIG. 2A, a block diagram depicting an exemplary cloud computing distributed infrastructure 200 suitable for use in embodiments of the invention is described. Generally, the cloud computing distributed infrastructure 200 illustrates an environment for providing services via a cloud computing platform. The cloud computing infrastructure 200 provides scalable, highly available, and durable services. For example, a storage service provides the ability to store data in different types of storage types. Each storage type has advantages and multiple storage types can be used within the same application. The cloud computing infrastructure can provide service APIs to support blobs, queues, tables and file system storage types. In particular, embodiments of the present invention provide a file service that supports SFA-based operations and REST-based operations for parallel access to a file system on the platform. The file service uses a SFA-REST interface comprising integrated functionality of an SFA protocol and REST protocol. The SFA-REST interface exposes a file system based on an SFA protocol such that the SFA-REST interface allows opening or creating files that return a handle to a file in the file system. When a handle is returned a client can read and write to the file using the handle. The SFA-REST interface also comprises elements of a REST protocol that allow direct REST-based operations including PUT and GET actions on the file. The protocol components are integrated to collectively provide access to the file system in parallel. In particular, the SFA-REST interface defines rules for interactions between SFA-based operations of the SFA protocol and REST-based operations of the REST protocol. The SFA-REST interface comprises SFA-based APIs and REST-based APIs that facilitate performing a variety of different operations based on parameters and returned values corresponding with each individual operation. With reference to SFA-based APIs, by way of example, the create API can include file name as a parameter and status, file handle, file time stamps, files size as returned values. The create API can allow a client to open or create a file having the file name. Additional parameters can control different aspects of the file and handle returned values. The SFA-based APIs further support an oplock command that can be set from the service to a client. An oplock can be created with a create SFA-based operation when files are opened or created, and the server under certain circumstances may need to break oplocks. Additional details on the SFA-based APIs that support oplocks, SMB leases, and interactions with REST-based APIs are discussed in more detail below.

It is important to note that SMB leases and oplocks may be used interchangeably herein, but differ in their implementation. In particular, SMB leases and oplocks are managed differently during client-server interactions. Oplocks may be accidently broken by a single client running two processes on the same client that may break the oplock, while SMB leases are protected from such accidental breaks in an SMB lease. The distinction can be noted as needed with reference to embodiments of the present invention.

With reference to the REST-based APIs, the REST-based APIs support stateless operations. By way of background, statelessness may refer to the notion that client-server communication is constrained by no client context being stored on the server between requests. Each request from any client contains all the information necessary to service the request, and session state is held in the client or there may be not state maintained at all in the client between requests. In this regard, there are no dependencies between requests. Further, authentication for REST-based operations can be handled the same way for each request based on signing a canonicalized version of a request to authenticate a REST-based operation with the customer's storage account key, and the passing the resulting signature along with the request. An exemplary REST-based API can be a create file API that allows a client to create a file. The create file API can have a name parameter and a status return value. Additional exemplary APIs are included herein by way of an appendix.

With continued reference to FIG. 2A, among other components not shown, the cloud computing distributed infrastructure 200 generally includes an SFA client 202, a REST client 204, a cloud computing platform 206, service APIs 208, storage 210 having blob 212, queue 214, table 216, and file system 218 and a network 220. The network 220 may include, without limitation, one or more local area networks (LANs) and/or wide area networks (WANs). Such networking environments are commonplace in offices, enterprise-wide computer networks, intranets and the Internet. Accordingly, the network 226 is not further described herein.

The SFA client 202 and the REST client 204 are computing devices having software or hardware that access services provided by the cloud computing platform 206. The clients may include any type of computing device, such as the computing device 100 described with reference to FIG. 1, for example. A client can access the cloud computing platform 206 via the network 220. The SFA client 202 and REST client 204 can in particular refer to computer programs that rely on the SFA protocol and REST protocol, respectively, to access services on the cloud computing platform 206. The clients may use service APIs 208 to have access to different storage types. The storage types include the blob 212 designed to store large binary objects with associated metadata like documents, pictures, video, and music files. The queue 214 is a reliable asynchronous message delivery storage types. The table 216 storage type provides structured storage capability to store lightweight data objects occupying terabytes of data. The file share 218 provides the capability to store files that can be shared and accessed in parallel from the SFA client 202 and REST client 204.

Figure 2B:
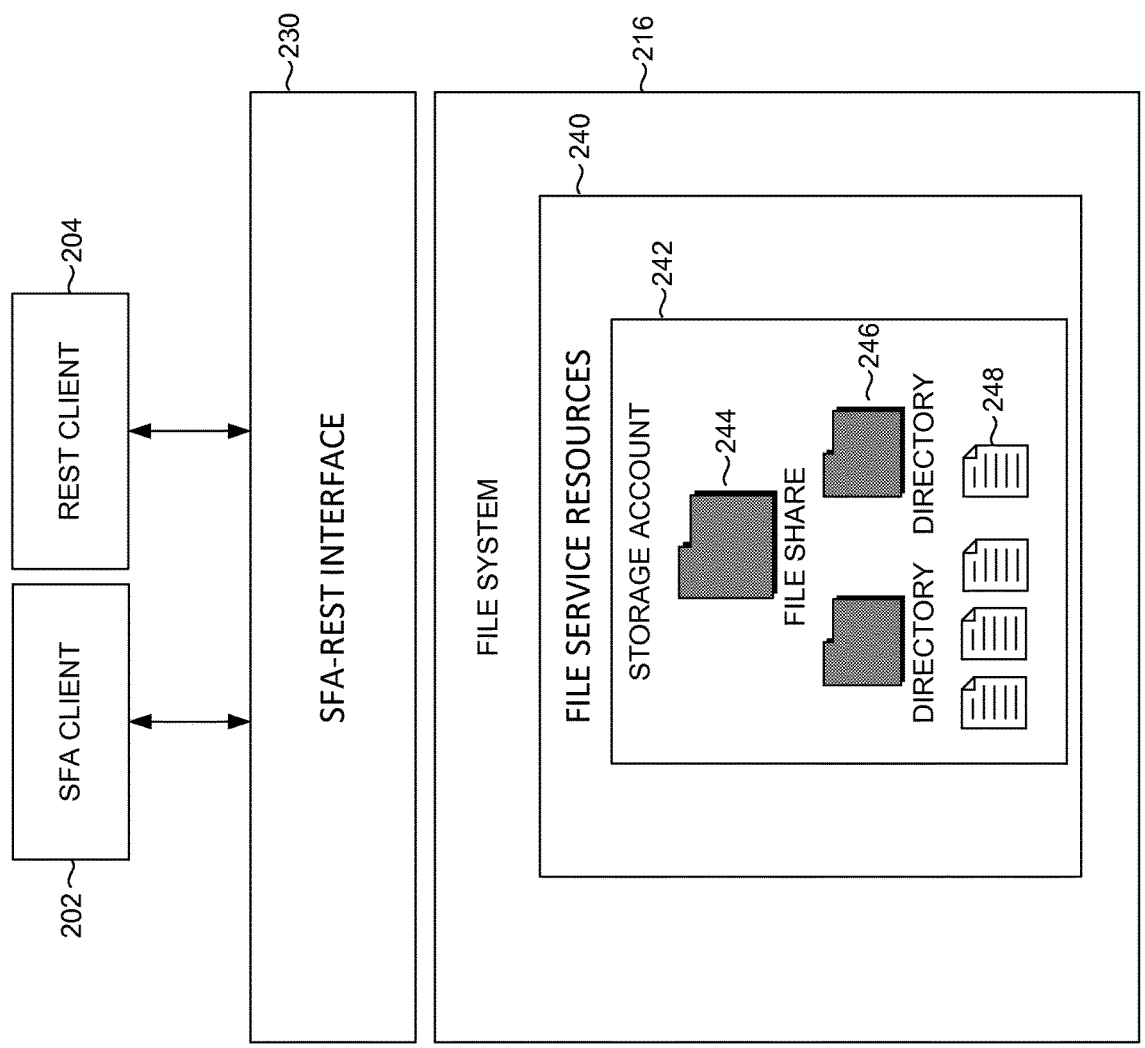

Turning to FIG. 2B, the SFA client 204 and the REST client 204 can, in particular, access a file service. The SFA-REST interface 230 comprises integrated functionality of an SFA protocol and a REST protocol to support file service resources 240. File service resources 240 comprise a storage account 242, shares 244, directories 246, and files 248. In particular, shares 244 provide a way to organize sets of files and also can be mounted as an SMB file share hosted in the cloud computing platform. The file service can provide access to file service resources 240 based on file service APIs ("SFA-REST interface") 230 in that the SFA client 202 and REST client 204 can simultaneously access file service resources 240. The SFA-REST interface can include APIs that support access file resources via HTTP operations. An operation can be associated with a resource type, and REST verb. For example, a create share operation can have a resource type of share and a REST verb PUT which upon execution of the operation creates a new share in a storage account. Additional operations are contemplated with embodiments of the present invention.

In embodiments, an operation can specify a version of the SFA-REST APIs to use. For example, an x-ms-version can be an HTTP header which is used to specify the version of operation. As such, users can specify which version of an operation they want to use by setting the x-ms-version request header. When a version identified in the HTTP header, if there is a new version of the API is available, it will not break the functionality of your existing code. Users can modify the code to call a newer version of API by specifying the x-ms-version HTTP Headers.

Figure 2C:
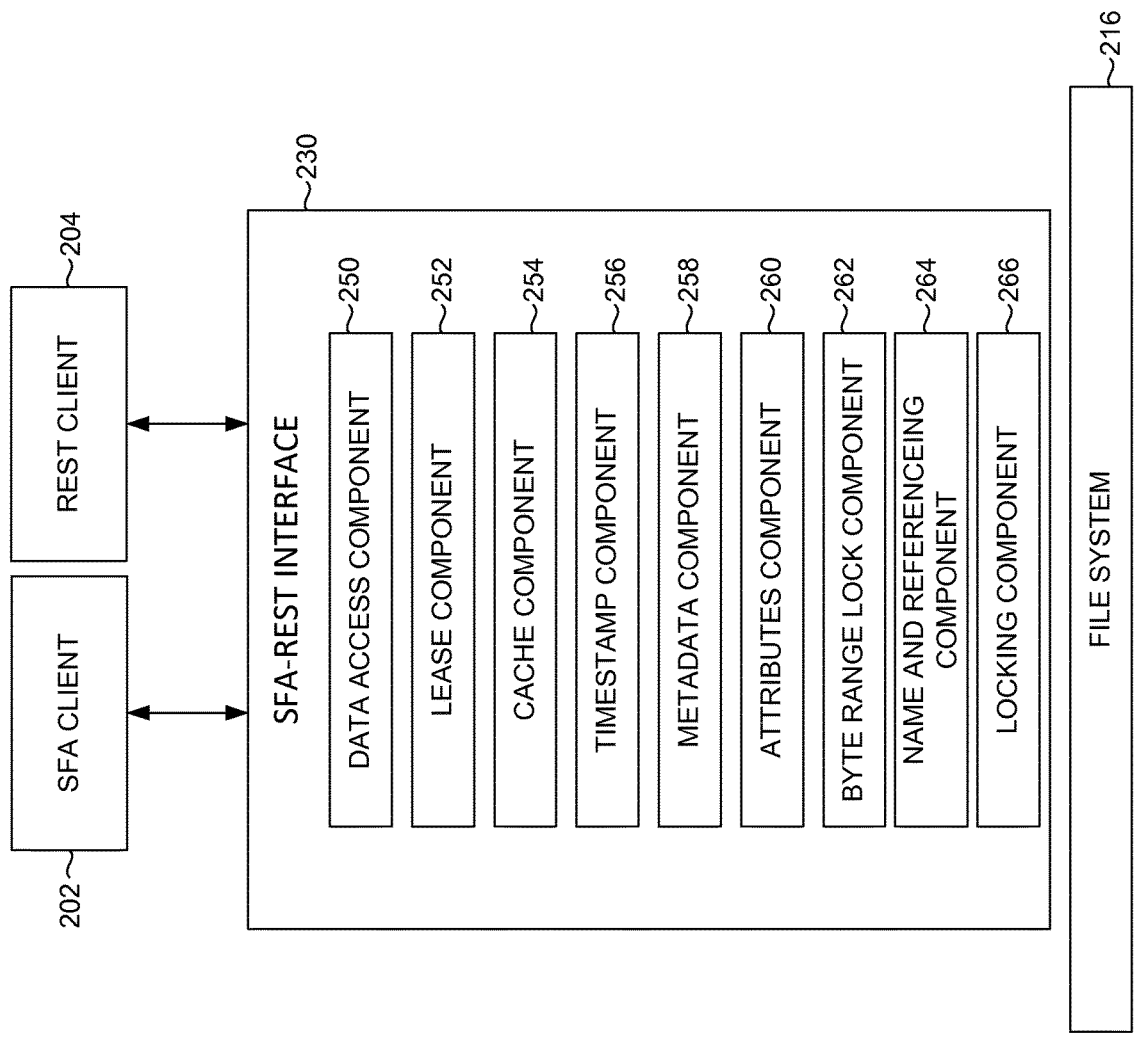

With reference to FIG. 2C, the SFA-REST interface 230 can include several different interface components (e.g., APIs) that support different integrated functionality of the SFA protocol and the REST protocol. The SFA-REST interface comprises, among others, a data access component 250, a lease component 252, a cache component 254, a timestamp component 256, a metadata component 258, an attributes component 260, a byte range lock component 262, a naming and referencing component 264 and a locking component 266.

Figure 2D:
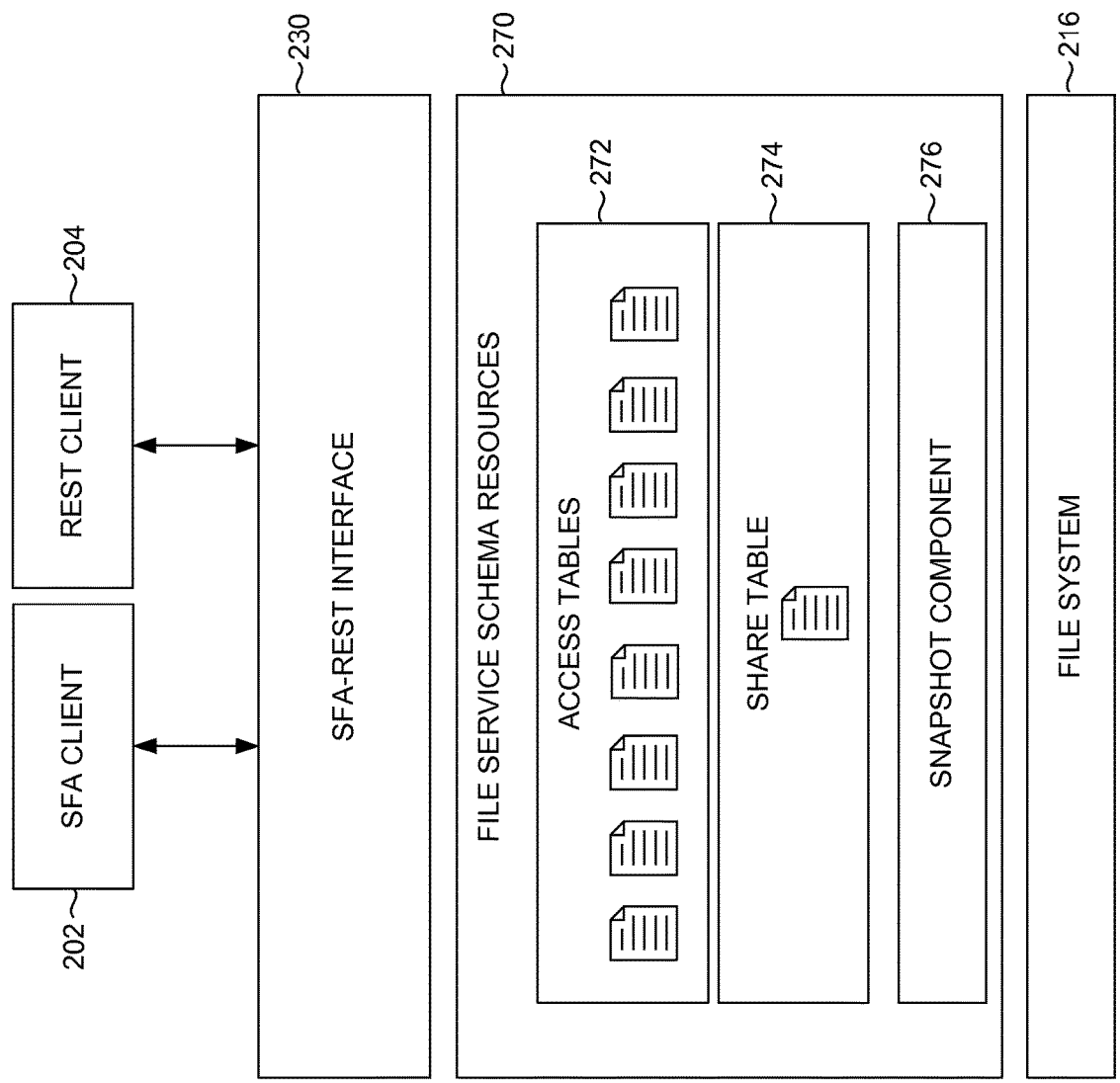

With reference to FIG. 2D, embodiments of the present invention further include a file service schema resources 270. The file service schema resources 270 facilitate access to the file system. The file service schema resources 270 include a schema having access tables 272, share table 274 and snapshot component 276. The schema having access tables 272 and a share table 274 provide access to a file system having file shares, directories, and files.

It should be understood that this and other arrangements described herein are set forth only as examples. Other arrangements and functionality (e.g., machines, interfaces, functions, orders, and groupings of functions) can be used in addition to or instead of those shown, and some functionality may be omitted all together. Further, many of the functionality described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The data access component can facilitate access to the file system. The data access component comprises SFA-based APIs and REST-based APIs that support access to the file system. In particular, the SFA-based APIs implement a handle, where data access (e.g., opening or creating a file) returns a handle to the file and allows read and write to the file using the handle. The REST-based APIs do not support an equivalent handle functionality found in the SFA protocol. The REST-based APIs support reading and writing files without the handle functionality but include corresponding elements based on the SFA protocol.

The lease component can facilitate executing file leases for shared access. The SFA-REST interface includes REST-based APIs that facilitate REST leases. REST leases allow exclusive write shared read access to a file for a duration of time. The duration may be a defined period of time, for example, 1 minute, or an infinite period of time. The SFA-REST interface also includes SFA-based APIs that support shared access based on file handles. By way of example, when a user creates or opens a file with SFA-based operations, the SFA-based operation can include an operation modifier. The operation modifier defines a constraint (e.g., access, sharing) that modifies the SFA-based operation. A constraint can be an access constraint such read, write, and delete, and a constraint can be a share constraint such as read sharing, write sharing, and delete sharing. The file service can determine whether an SFA-based operation should be performed to provide access to a file, based on whether the operation modifiers from all other handles that are currently open to that file are compatible with the current operation modifier on the SFA-based operation.

The lease component implements REST-based APIs for REST leases to function similarly to opening a file handle to the file to access the file for read, write, and delete, and allowing shared read from other handles. The lease component performs a validation to confirm no existing leases when a REST-based operation acquires or renews a REST lease, and can return an error indicating that a lease is not allowed because there are other handles or leases of the file open that are incompatible with a REST-based operation. As such, a REST-based operation or an SFA-based operation to open a file can be failed based on referencing a lease associated with a previous REST-based operation or an operation modifier associated with a previous SFA-based operation.

The cache component manages how REST-based operations and SFA-based operations with opportunistic locks interact. SMB Oplock (opportunistic lock) is a caching mechanism that SFA clients request in order to improve the performance and reduce network transfers. This means the latest state of a particular file or directory may be cached on an SFA client. There are multiple Oplock types, referred to as SMB lease types: Read (R): when acquired, client can read from local cache. Write (W): when acquired, client can write locally without the need to flush the data back to the SMB service. Handle (H): When acquired, client does not have to notify the SMB service when a handle close happens. An oplock is useful in case an application keeps on opening and closing files with the same access and sharing mode. The SFA client need not notify the SMB service for every close immediately. The above SMB lease types are independent of access and sharing mode specified during open handle. Typically SFA clients attempt to acquire all the lease types whenever it opens a new handle against a file regardless of access and sharing mode.

Depending on the REST-based operation, it may be necessary for REST requests to break existing SFA client oplocks. This would require SFA clients to flush cached changes to the file service in case of a Write Oplock. Below are some of the reasons where each type of oplock needs to be broken: A Read (R) oplock needs to be broken whenever a write REST operation is issued such as PutRange. A Write (W) oplock needs to be broken whenever a read REST operation is issued such as GetBlob. A Handle (H) oplock needs to be broken whenever a client issues a Delete REST operation since file service needs no handles open for a Delete request to succeed.

Breaking the oplock comprises potentially flushing SMB cached client changes and this may cause extra delays in the REST service operation response time, or may cause the REST operation to fail with status code 408 (Request Timeout) and error code identifier (e.g., ClientCacheFlushDelay). An exemplary scenario includes where an opblock break and flush are needed and REST client experiences delay. In this scenario, the SFA client opens a file, acquires an RWH oplock and writes data locally. The REST client sends a GetFile request. The file service breaks the write (W) oplock and leaving the client with an RH oplock. The SFA client flushes its cached data against the file service and acks the oplock break. The file service processes the GetFile request and responds back with the requested data. In the above example, the REST client will experience delays caused by the oplock break and time taken by the SFA client to flush its data against file service. Any subsequent GetFile requests will not experience any additional delays since the write (W) oplock is already broken.

Another exemplary scenario includes where the Opblock break is needed but REST client does not experience delay. In this scenario, SFA client already has an RH oplock (continuation from the above example). The REST client issues a PutRange request. The file service sends an oplock break request to the SFA client but it does not wait for a response. The file service processes the PutRange request. In the above example, though oplock break is needed, the REST operation does not experience any additional delays since a response is not needed when breaking the Read oplock.

The file service may have different behaviors correspond to each REST-based operation based on the Oplock state of the SFA client that already has a handle open over the same file. Blocking oplock break refers to the fact that file service may have to wait for an acknowledgement that the break was successful, whereas in the case of non-blocking, the file service does not. In case of a blocking Oplock break being needed, and if the break does not succeed within the specified request timeout and up to 30 seconds, the REST operation can fail with status code 408 (Request Timeout) and error code identifier (e.g., ClientCacheFlushDelay).

Further, by way of example, a DeleteFile request would also require breaking the oplock Handle (H) lease; this is performed in order to ensure that there are no file handles open from the SMB side when DeleteFile is issued from the REST client. If there is a sharing violation, the request will fail with status code 409 (Conflict) and error code identifier (e.g., SharingViolation).

The timestamp component can function to identify when events occur. In particular, the timestamp component may be a multi-timestamp implementation such that integrated functionality of an SFA protocol and REST protocol can be available through the SFA-REST interface. The REST-based APIs provide support for an optimistic concurrency model. The optimistic concurrency model is based on accurate timestamps. In the optimistic concurrency model when the file service receives a REST-based operation to access a file, the file service generates and returns an entity tag ("ETAG") that is a precise timestamp that is guaranteed to be incremented on every write to the file. The ETAG can be passed back to subsequent REST-based operations, such as, reads or writes as a conditional header that will cause the REST-based operation to fail if the file has changed between the calls or fail if the ETAG has not changed. SFA-based APIs do not implement an optimistic concurrency model. Instead the update of the timestamp is performed when a file handle is closed. In addition, traditional file systems usually allow an SFA client to explicitly set the timestamp on file to arbitrary times.

The timestamp component supports 5 different timestamps on each file. Four of the timestamps can be based on SFA-based APIs. The timestamps include creation time, last modify time, last write time, and last access time. The four time stamps may be implemented using the same semantics as SMB-protocol. The fifth time stamp is the ETAG that can be used for optimistic concurrence. The fifth timestamp is not exposed through the SFA-based APIs. All five stamps are available through the REST-based APIs. In this regard, the timestamp can support integrated functionality between the SFA-based operations and REST-based operations based on the 5 different time stamps. In particular, because the REST-based operations depend on the optimistic concurrency model, the ETAG timestamp needs to be updated when SFA-based operations are executed on a file. As such, the SFA-REST interface supports updating the ETAG along with the other timestamps when an SFA-based operation is executed. In an exemplary scenario with a conditional REST-based operation, if a file has been updated using an SFA-based operation, the subsequent conditional REST-based operation needs to determine that an updated ETAG exists to validate whether the conditional REST-based operation can be performed.

The metadata component can be configured to support descriptive information about the data content. REST-based APIs allow a small set of arbitrary name and value pairs to be associated with a file. The SFA-based APIs have extended attributes that can be associated with a file. The name restrictions are based on the SMB-protocol which is more restricted (length and valid characters) than typical REST protocol. To make the SFA protocol and REST protocol compatible, the REST-based APIs have been implemented with restricted names available to metadata.

A naming and referencing component can support accessing file service resources. File service resource can be access based on names or reference syntax. A storage account can contain zero or more shares. A share contains properties, metadata, and zero or more file or directories. A directory can contain properties and zero or more files or directories. A file can be any single entity comprised of binary data, properties, and metadata.

With reference to share names, the file service share name rules may be implemented more restrictively in the APIs of the SFA-REST interface than the SFA protocol. As such, APIs for a blob service and APIs of the SFA-REST interface can share similar naming conventions for a blob container and file share.

With reference to directory names and file names, the SFA-REST interface further supports APIs that are case insensitive and case preserving. The allowed lengths of file and directory names are limited for each individual component (the part between slashes) in the REST-based APIs and the total length of path names for REST-based APIs allows longer and deeper names than indicated in the REST protocol. The name and reference component comprises REST-based APIs that no longer support characters that are typically legal in the REST protocol in that the characters are now illegal, and the SFA protocol characters that are typically illegal in REST are now legal in REST-based APIs. In one embodiment, the characters that are not supported in a REST protocol but now supported in the REST-based APIs of the name and reference component can be escaped in the REST-based APIs. Escaping the characters comprises encoding a selected character with a % HEX code. Other variations and combinations of encoding illegal REST protocol characters to make them legal in REST-based APIs are contemplated with embodiments of the present invention.

A pathname comprises one or more pathname components (directory or file name) separated by the "/" forward-slash character. All pathname components other than the last pathname component can denote directories. The last pathname component denotes a directory of file. A pathname can be no more than a predefined number of (e.g., 1,024) characters in length. A pathname can composed of one or more pathname components separated by the "/" forward slash character. A subdirectory depth can be configured not to exceed a predefine depth (e.g., 250). A file cannot share the same path as a directory and vice versa i.e. the same name cannot be used for a file or directory that share the same parent directory. Example: a file and directory with name "data" cannot exist under the same parent path.

Metadata for a share or file resource can be stored as name-value pairs associated with the resource. Directories can be implemented without metadata. Metadata names can be based on the naming rules for C# identifiers. Metadata names can preserve the case with which they were created, but are case-insensitive when set or read. If two or more metadata headers with the same name are submitted for a resource, the file service returns status code 400 (Bad Request).

The SFA-REST interface can support Uniform Resource Identifier ("URI") references for a share, directory or file. Each file service resource can have a corresponding base URI which refers to the resource itself. For the storage account, the base URI can include the name of the account only. For a share, the base URI can include the name of the account and the name of the share. For a directory, the base URI can include the name of the account, the name of the share, and the path of the directory. For a file, the base URI includes the name of the account, name of the share, and the path of the file. The URI can uniquely implement URIs. Because every account name is unique, two accounts can have shares with the same name. However, within a given storage account, every share can be implemented with a unique name. Files within a given share or directory can also have unique names within that share or directory. An attempt to create a share, directory, or file with a name that violates naming rules, the request can fails with status code 400 (Bad Request).

A byte range lock component can support byte range locking for the SFA-REST interface. SFA-based APIs can allow an SFA client to request exclusive access to a range of a file, as well as read access to a range of a file. This ensures that there are no other writes within that range but allows readers. The byte range lock component can be configured to reject read or writes through the REST-based APIs when a conflict exists with the logic of the SFA byte range locks. SFA-based APIs allow byte range locks to manage read and write access to regions of a file, the REST-based APIs may not leverage this capability for a particular implementation. As such, instead, REST-based APIs may need write access to the entire file. This also means a REST-based operation can fail if an SFA client has a lock on any range within the file. Nonetheless, the REST-based operation can be implemented with REST-based APIs that support byte range locking.

The access component is responsible for supporting access to the file service based on two different protocol endpoints. The access component provides for an endpoint point for the SFA protocol and a separate endpoint for the REST protocol. In this regard, requests and responses for the SFA client are communicated via the SFA protocol endpoint and requests and responses for the REST client are communicated from the REST protocol endpoint.

The locking component is responsible for managing file locks. The locking component is configured to process an SFA-based operation and execute the operation using the operation modifier and process a REST-based operation based on referencing the operation modifier. The operation modifier may be a locking modifier that indicates an access mode and a share mode. By way of example, the SFA client may mount a share as a file share. Using the SFA-REST interface, the SFA client can leverage the file system locking mechanisms in the locking component manage access to shared files. An SFA-based operation to access to a file may include an operation modifier. Through the locking component, the operation modifier can be a locking modifier that request whole file access sharing for read, write, and delete or byte range lock to manage read and write access to regions within a single file. When an SFA client opens a file, the SFA-based operation to open the file includes the locking modifier having file access and share mode. The following file access locking modifiers are typically used by SFA clients: Read: Opens a file for reading only. Write: Opens a file for write access only. Read/Write: Opens a file with read/write permissions. Delete: Opens a file for delete access only.

The following file share locking modifiers are typically used by SFA clients: None: Declines sharing of the current file. Any request to open the file will fail until the file is closed. Shared Read: Allows subsequent opening of the file for reading. If this flag is not specified, any request to open the file for reading will fail until the file is closed. Shared Write: Allows subsequent opening of the file for writing. If this flag is not specified, any request to open the file for writing will fail until the file is closed. Shared Read/Write: Allows subsequent opening of the file for reading or writing. If this flag is not specified, any request to open the file for reading or writing will fail until the file is closed. Shared Delete: Allows subsequent deleting of a file. If this flag is not specified, any request to delete the file will fail until the file is closed.

SFA client sharing may be further illustrated by way of examples. For example, File Opens without Sharing Violation: Client A opens the file with FileAccess.Read and FileShare.Write (denies subsequent Read/Delete while open). Client B then opens the file with FileAccess.Write with FileShare.Read (denies subsequent Write/Delete while open). Result: This is allowed since there is no conflict between file access and file share modes.

Sharing Violation Due to File Access: Client A opens the file with FileAccess.Write and FileShare.Read (denies subsequent Write/Delete while open). Client B then opens the file with FileAccess.Write with FileShare.Write (denies subsequent Read/Delete while open). Result: Client B encounters a sharing violation since it specified a file access that is denied by the share mode specified previously by Client A.

Sharing Violation Due to Share Mode: Client A opens the file with FileAccess.Write and FileShare.Write (denies subsequent Read/Delete while open). Client B then opens the file with FileAccess.Write with FileShare.Read (denies subsequent Write/Delete while open). Result: Client B encounters a sharing violation since it specified a share mode that denies write access to a file that is still open for write access.

A REST-based operation may not open a file with an operation modifier. However the REST-based operation respects the share mode specified for any file open on an SFA client. REST-based operations interacting with SMB share modes may be further illustrated by way of examples. REST Get File Sharing Violation: SFA client opens the file with FileAccess.Read and FileShare.Write (denies subsequent Read/Delete while open). REST Client then performs a Get File (REST API) operation on the file (thereby using FileAccess.Read as specified in the table above). Result: The REST Client's request fails with status code 409 (Conflict) and error code SharingViolation since SFA client still has the file open while denying Read/Delete access).

REST Put Range Sharing Violation: SFA client opens the file with FileAccess.Write and FileShare.Read (denies subsequent Write/Delete while open). REST Client then performs a Put Range (REST API) operation on the file (thereby using FileAccess.Write as specified in the table above). Result: The REST Client's request fails with status code 409 (Conflict) and error code SharingViolation since SFA client still has the file open while denying Write/Delete access).

It is contemplated that the SFA client sharing mode can have implications on the REST-based operations. Depending on the sharing mode specified when an SFA client opens a file, it is possible for the file service to return a conflict (e.g., status code 409) with error code Sharing Violation. The file returns sharing violations due to files open on an SFA client. By way of example, the SFA client file sharing mode can be Shared Read which denies writes, and delete. As such, create file, set file properties, set file metadata, delete file, and put range REST-based operation fail with a sharing violation indication. The file service may return sharing violations due to file open on SFA clients.

The delete component is responsible for managing deletes. The delete component is configured to process an SFA-based delete operation and execute using the operation modifier and process a REST-based delete operation based on referencing the operation modifier. When an SFA client opens a file for delete, it marks the file as pending delete until all other SFA client open handles on the file are closed. While a file is marked as pending delete, any REST-based operations on the file will return status code conflict with an error code identifier (e.g., SMBDeletePending). Status code 404 is not returned since it is possible the SFA client to remove the pending deletion flag prior to closing the file. In other words, status code 404 (not found) is expected when the file has been removed. Further, when a file is in an SMB pending delete state, it may not be included in the List Files results. It is contemplated that the REST-based delete file and delete directory operations are committed atomically and do not result in a pending delete state.

Attribute component is configured for managing file attribute implications on REST-based operations. SFA clients using SFA-based operations can read and set file attributes including Archive, Read-only, Hidden, and System. If a file or directory has the read-only attribute set (even if it is opened in SMB with read sharing) then any REST-based operation that attempts to write to the file may fail with status code 412 (Precondition Failed) and error code identifier (e.g., ReadOnlyAttribute). These REST-based operations may include: Create File, Set File Properties, Set File Metadata, and Put Range. Further, it is contemplated that file attributes may not be set or read from REST clients. Once a file is made read-only, REST clients will be unable to write to the file until the SFA client removes the read-only attribute.

With continued reference to FIG. 2D, the file service supports a file service schema resources 270. Accordingly, the SFA-REST interface facilitates accessing files based on the schema. An SFA client or REST client can each generate an SFA-based operation or REST-based operation, respectively, that access file a file system using the schema implemented based on the SFA-REST interface. In this regard, the schema fields comprise elements of the SFA-REST interface that support parallel SFA-based and REST-based access to the file system.

The schema can be a logical schema. It is contemplated that the physical representation of the schema can be different to account for nuances of the underlying database. The physical representation of the schema may also be altered to be backward compatible. The schema may be based on a plurality of tables. In one implementation, the schema includes 8 file access tables and a share table. A primary table may be a namespace table where files and directories are stored based on their names. The namespace table can include the name of the share. The namespace table can be hierarchical in that files and directories are stored as a child of their parent directory. The full path of a file or directory is determined based on multiple lookups in the namespace table. Files can include an ID in the table which is used to lookup information about the file in another access table.

The schema can further include an information table. The information table can be used to store information about the content of the file. The information table does not store the content of the file itself. The key to this table is the file ID.

The schema can also support a page range table. The page range table can be used to store actual data for the filed stored. The key to the page range table includes both the file ID and the offset as size of the page range that is stored.

The schema can further support a handle table. The handle table can be used to represent the handles that have been open on a file. The handle table supports opening or creating files that return a handle to a file in the file system. When a handle is returned a client can read and write to the file using the handle.

The schema also supports a lease table. The lease table can be used for support SMB leases that provide for file caching based on operation modifiers. In particular, the lease table can be used to store a lease state based on the operation modifiers of an SFA-based operation associated with a corresponding file.

Two additional access tables may be configured in the schema for storing change notification settings and events for directories. The two tables can be the change notify table and the change notify events table. In particular, the change notify table can be updated when an operation registers to detect changes within a directory. Each time a write operation is performed for a file, a corresponding operation is executed to check the change notify table to determine whether the data needs to be entered the events table.

A byte lock table can be used to store byte range lock for file. Byte range locks can be acquired through the file service. A byte range lock refers to a scenario where an SFA client requests exclusive access to a range of a file, as well as read access to a range of a file. This ensures that there are no other writes within that range but allows readers.

With continued reference to FIG. 2D, a plurality of load balancers (not shown) can be implemented for partitions across the cloud computing infrastructure. Transactions that are executed atomically are executed within a single partition. By way of background, an atomic transaction refers to a series of database operations that either all occur or nothing occurs. A guarantee of atomicity prevents updates to the database occurring only partially, which can cause greater problems than rejecting the whole series outright. Atomicity refers to indivisibility and irreducibility. In one embodiment, the schema is partitioned at the share level. In this regard, the transaction on a share can be implemented within a single partition. The schema may further allow the increase of the number keys that are part of the partition key such that a share can be stored in multiple partitions. This can allow a single share to be served by multiple backend nodes which results in better performance.

The file service supports a snapshot component that implements snapshotting to quickly and easily back up the file storage. The schema facilitates snapshotting. A share table in the schema support snapshotting operations. In particular, new changes can be written in a copy-on-write type of pattern so that the old versions, at each snapshot, can be accessed at a later time. In a normal state before a snapshot is taken, the share table can have an entry for every share. The share table schema comprises access permissions for the share, an indication whether a row is valid or invalid, a last modification time, and expiration time, and a snapshot version that facilitate performing snapshot operations.

A share snapshot can be based on 3 operations. An update operation updates the share table to indicate that a snapshot will be created. The create update operation comprises adding a new row with snapshot version identifier and updating the row with snapshot version identifier to include the timestamp of the snapshot. At this point, if there are any clients writing to the share, the writes continues with the snapshot version 0. If the snapshot fails the operation cleans up snapshot version 0 as it expired 1 day later. A write notification operation comprises notifying a node that supports the share to start writing to the new snapshot version for the share. Again, if a failure occurs this would result in writing to the old snapshot version, and clean up can occur later. The third operation is a complete update operation that updates a share table to indicate that the snapshot completed successfully. The file service can send a notification to the client that snapshot complete successfully. If the changes cannot be committed on the table, the clients would be writing to version 1 which is also valid.

The snapshot component further support garbage collection. Garbage collection can be performed on the share table upon failure of a snapshot operation. For example, a row having the failed snapshot version can automatically clean itself after a predefined period of time. Also the snapshot component creates another snapshot, the table can be updated, and the node writing to the share can be writing to snapshot version 2.

The snapshot component can further support atomic snapshots, non-atomic snapshots, and cross-share atomic snapshot. The snapshot component may communicate with nodes to create an atomic snapshot. Each node is capable of modifying a partition of the file schema. In particular, each node is capable of atomically modifying a partition. The snapshot component can send notifications to the nodes. The atomic snapshot process comprises two notifications. The block notification directs one or more nodes to block writes to a selected partition. The block notification can include a fixed amount of time for which to block writes to the selected partition. The write notification directs the one or more nodes to start writing to a new snapshot version. If the writing operation cannot be completed, in that, all of the one or more nodes cannot start writing to the new version within the fixed amount of time, the snapshot component can fail the snapshot. The snapshot component may upon a failure attempt another snapshot operation. The new snapshot operation can create a new snapshot as a new version.

The snapshot component can also facilitate creating a non-atomic snapshot. The non-atomic snapshot can be created using a single write notification. The snapshot component can communicate a notification directing one or more node to start writing to a new snapshot version. The snapshot component can then update a share table when the one or more nodes are all using the new version of the snapshot.

The snapshot component can also facilitate creating a cross-share atomic snapshot. The cross-share atomic snapshot may refer to a snapshot that can be extended across multiple shares. The snapshot component performs a series of operations to execute the cross-share atomic snapshot. The snapshot component can add a new row to a table of a share that is part of the snapshot. The snapshot component then communicates a write notification directing one or more nodes corresponding to shares of the snapshot to start writing to a new snapshot version. The snapshot component can then update the share table. An SFA client or REST client can refer to a snapshot version based on a timestamp associated with the snapshot version. The same timestamp can be assigned to snapshots versions from multiple shares. In this regard, the shares of a snapshot version with the same timestamp may be constructively linked.

Figure 3:
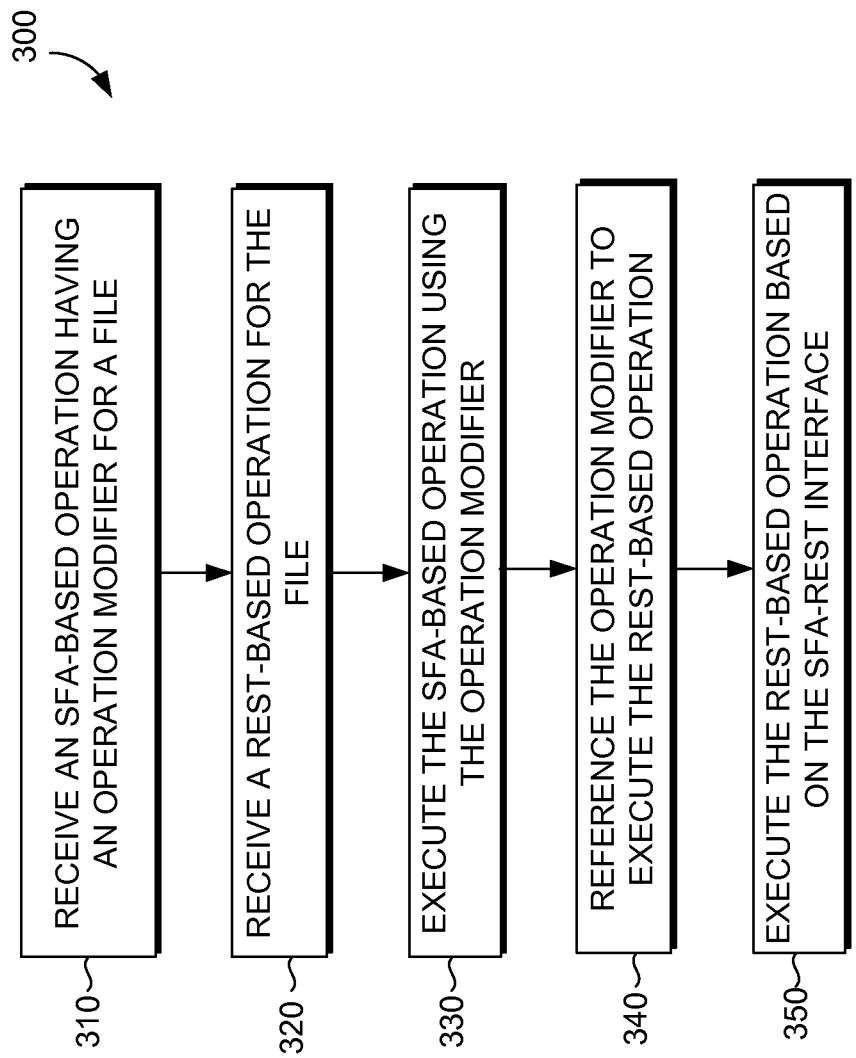
FIG. 3 is a flow diagram showing a method for accessing files in distributed file systems, in accordance with embodiments of the present invention.

Turning now to FIG. 3, a flow diagram is provided that illustrates a method 300 for accessing files in distributed file systems. Initially at block 300, an SFA-based operation having an operation modifier for a file in a distributed file system is received. The SFA-based operation is defined based on a file-representational state transfer (REST) interface. The SFA-REST interface comprises integrated functionality of an SFA protocol and REST protocol. At block 310, a REST-based operation for the file in the distributed file system, the REST-based operation is defined based on the SFA-REST interface. At block 330, the SFA-based operation is executed using the operation modifier. At block 340, the operation modifier is referenced to execute the REST-based operation. The REST-based operation is executed based on the SFA-REST interface.

Figure 4:
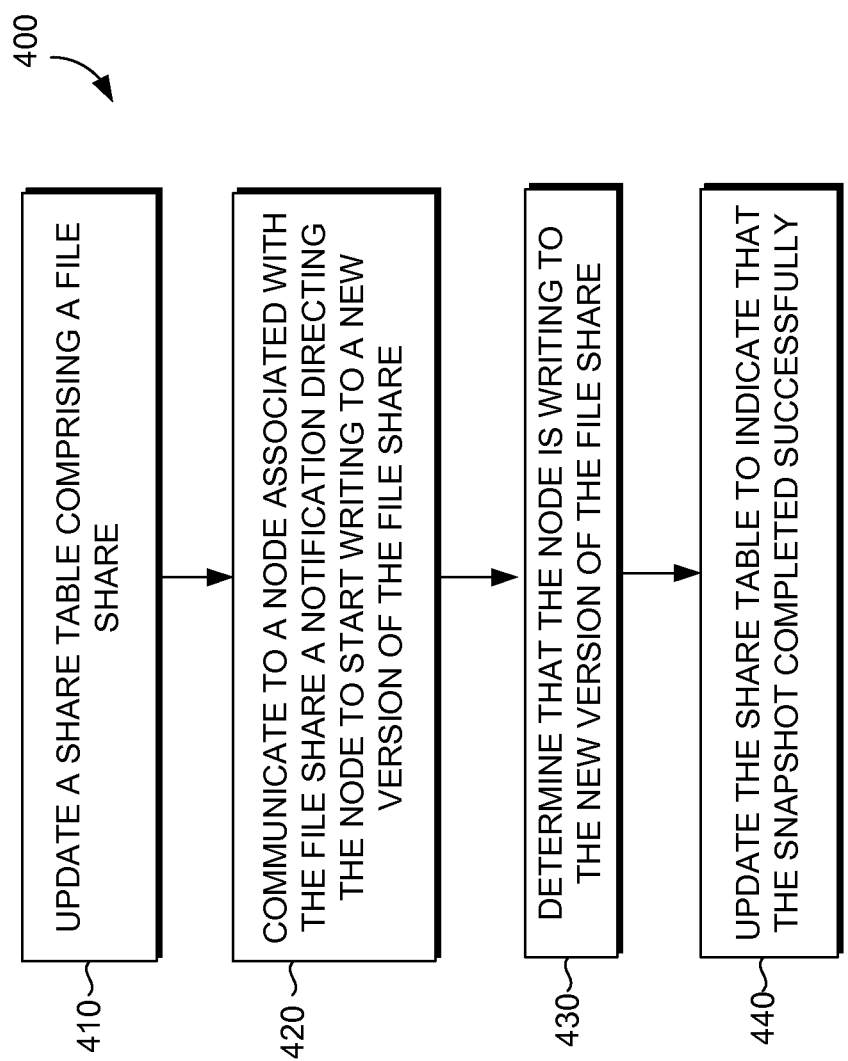
FIG. 4 is a flow diagram showing a method for snapshotting file shares, in accordance with embodiments of the present invention.

Turning now to FIG. 4, a flow diagram is provided that illustrates a method 400 for snapshotting file shares. Initially at block 410, a share table comprising a file share is updated. Updating the share table comprises adding a row to the share table, the row associated with a new version of the file share. At block 420, a notification directing the node to start writing to the new version of the file share is communicated to a node associated with the file share. At block 430, it is determined that the node is writing to the new version of the file share. At block 440, the share table is updated to indicate that the snapshot completed successfully.

Figure 5:
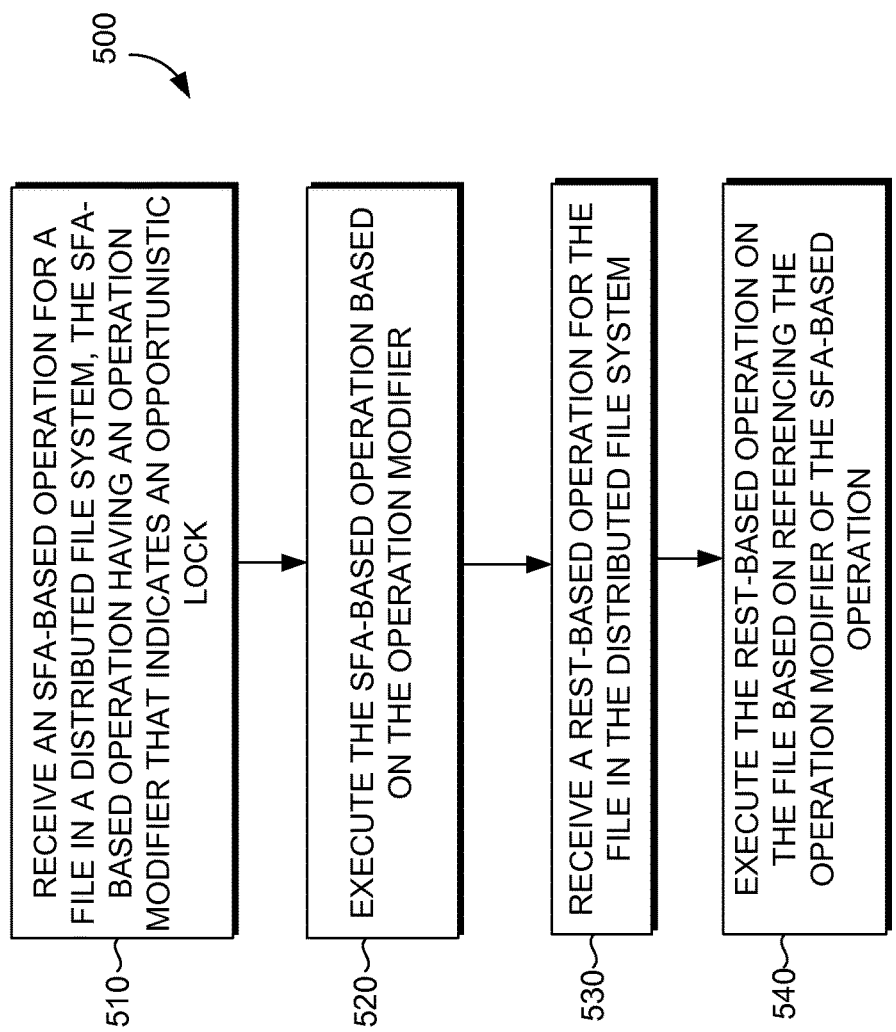
FIG. 5 is a flow diagram showing a method for accessing files in distributed file systems, in accordance with embodiments of the present invention.

Turning to FIG. 5 a flow diagram is provided that illustrates a method 500 for access files in distributed file systems. Initially, at block 510 an SFA-based operation for a file in a distributed file system is received from an SFA client. The SFA-based operation having an operation modifier that indicates an opportunistic lock of the SFA-based operation. The SFA-based operation is defined based on an SFA-REST interface. At block 520, the REST-based operation is executed on the file based on referencing the operation modifier of the SFA-based operation. At block 530, a REST-based operation for the file in the distributed file system is received from a REST client. The REST-based operation is defined based on the SFA-REST interface. At block 540, the REST-based operation is executed on the file based on referencing the operation modifier of the SFA-based operation.

The flow diagram in FIG. can further be described by way of example. As discussed above an SMB opportunistic lock (oplock) is a caching mechanism that SMB clients may request in order to improve performance and reduce network transfers. As such, a latest state of a particular file or directory may be cached on an SMB client. There are multiple opportunistic lock types, referred to as SMB lease types: Read (R): When acquired, client can read from local cache; Write (W): When acquired, client can write locally without the need to flush the data back to the SMB service; Handle (H): When acquired, client does not have to immediately notify the SMB service when a handle close happens. This is useful in case an application continues opening and closing files with the same access and sharing mode. It is important to note that the above SMB lease types are independent of the access and sharing mode specified. Typically an SMB client attempts to acquire all lease types whenever it opens a new handle against a file, regardless of access and sharing mode.

Depending on the REST operation called, it may be necessary for a request to break an existing opportunistic lock. In the case of a write oplock, the SMB client must flush cached changes to the File service. Here are some cases where each type of oplock needs to be broken: A Read (R) oplock needs to be broken whenever a write operation is issued, such as Put Range; A Write (W) oplock needs to be broken whenever a read operation is issued, such as Get File; A Handle (H) oplock needs to be broken whenever a client issues a delete operation, since the File service requires that no handles can be open if a delete operation is to succeed. Handle oplocks are also broken when a REST operation faces a sharing violation with an existing SMB handle (see table above) to verify that the handle(s) are still actually opened by an application on the client.

Breaking the oplock may require flushing cached SMB client changes, which may cause delays in operation response time, or may cause the operation to fail with status code 408 (Request Timeout) and error code ClientCacheFlushDelay. Following are some scenarios where oplocks are broken:

In a first example, an opblock break and SMB client flush are required, and the REST client experiences a delay: (1) The SMB client opens a file, acquires an RWH oplock, and writes data locally. (2) The REST Client sends a Get File request. (2)(i) The File service breaks the write (W) oplock, leaving the client with an RH oplock. (2)(ii) The SMB client flushes its cached data against the File service and acknowledges the oplock break. (2)(iii) The File service processes the Get File request and responds back with the requested data. In the above example, the REST client may experience delays caused by the oplock break and the time taken by the SMB client to flush its data against the File service. Note that subsequent calls to Get File will not experience any additional delays since the write (W) oplock has already been broken.

In a second example, an oplock break is required, but the REST client does experience a delay. (1) The SMB client has acquired an RH oplock. (2) The REST Client sends a Put Range request. (2)(i) The File service sends an oplock break request to the SMB client and does not wait for a response. (2)(ii) The File service processes the Put Range request. In the above example, the oplock break is required, but the Put Range request will not experience any additional delays since a response is not needed when breaking the read oplock.

Several operations exist where the behavior of the file service for each REST operation is based on the oplock state of the SMB client that has already acquired a handle on the same file and assuming the SMB handle access and sharing does not conflict with the REST operation. If a conflict exists the handle oplock is also broken to make sure the handle is really still open on the client. In the case of a blocking oplock break, the File service can wait for an acknowledgement that the break was successful. In the case of a non-blocking oplock break, it does not have to wait.

In a case where a blocking oplock break is required, if the break does not succeed within the specified request timeout or within 30 seconds, whichever completes first, the REST operation will fail with status code 408 (Request Timeout) and error code ClientCacheFlushDelay. It is contemplated that the Delete File request also requires breaking the oplock handle (H) lease. This ensures that any file handles are still actually opened by an application on the SMB client when a REST client calls Delete File. If there is a sharing violation, the request fails with status code 409 (Conflict) and error code Sharing Violation.

Figure 6:
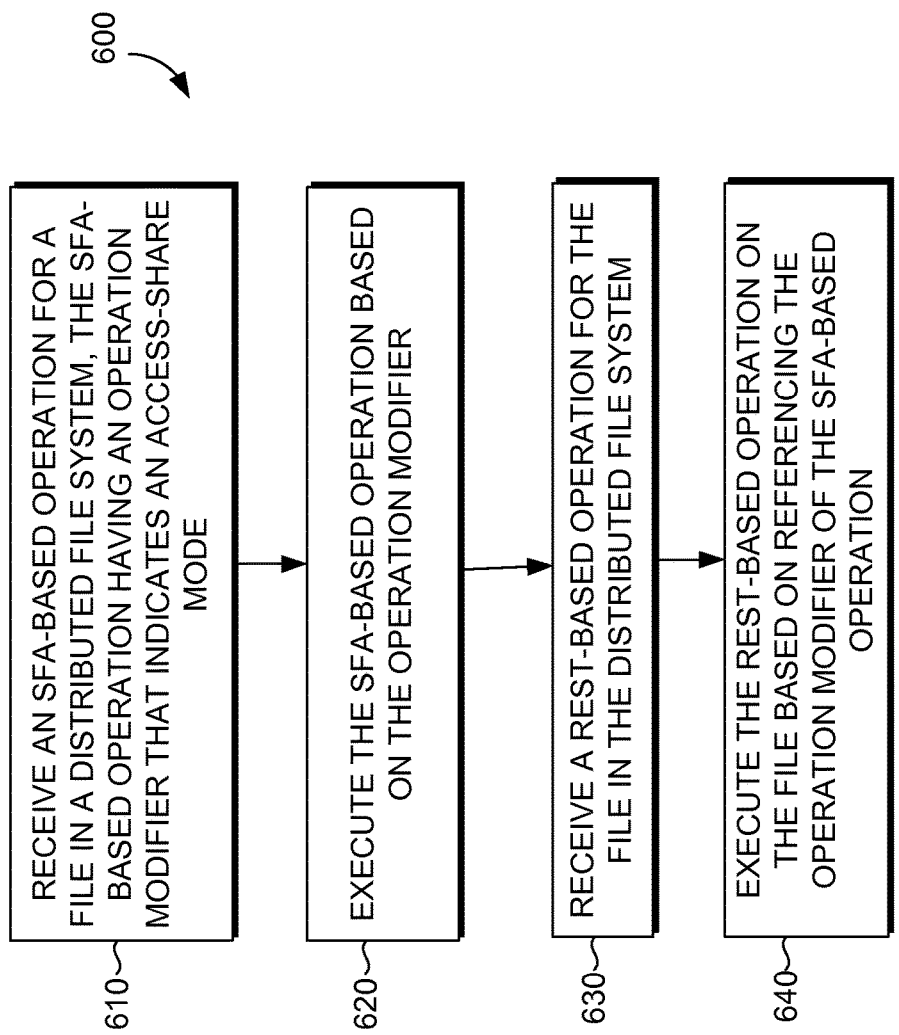
FIG. 6 is a flow diagram showing a method for accessing files in distributed file systems, in accordance with embodiments of the present invention.

Turning to FIG. 6 a flow diagram is provided that illustrates a method 500 for access files in distributed file systems. Initially, at block 610 an SFA-based operation for a file in a distributed file system is received from an SFA client. The SFA-based operation having an operation modifier that indicates an access-share mode of the SFA-based operation. The SFA-based operation is defined based on an SFA-REST interface. At block 620, the REST-based operation is executed on the file based on referencing the operation modifier of the SFA-based operation. At block 630, a REST-based operation for the file in the distributed file system is received from a REST client. The REST-based operation is defined based on the SFA-REST interface. At block 640, the REST-based operation is executed on the file based on referencing the operation modifier of the SFA-based operation.

The flow diagram in FIG. can further be described by way of example. A REST Get File Sharing Violation implement can occur when an SMB Client opens a file with File Share.Write (but not FileShare.Read which would mean other clients are allowed to read the file at the same time). A REST Client then performs a Get File (REST API) operation on the file (thereby using FileAccess.Read as specified in the table above). This results in the REST Client's request failing with status code 409 (Conflict) and error code SharingViolation since SMB Client still has the file open while denying Read/Delete access).

With reference to Table 1, several different SMB access modes can be determined when a REST-based operation is received such that the REST-based operation is executed based on the access mode.

TABLE 1

| REST Operation | REST Operation File Access Equivalent | Comments |
|---|---|---|
| List Files | N/A | |
| Create File | Write/Delete | If file is currently open in SMB, can only create the file via REST if the file has write or write/delete share mode. |
| Get File | Read | If file is currently open in SMB, can only read the file via REST if the file is open with shared read. |
| Set File Properties | Write | If file is currently open in SMB, can only set the file properties via REST if the file is open with Write sharing |
| Get File Properties | N/A | |
| Set File Metadata | Write | If file is currently open in SMB, can only set the file metadata via REST if file is open with Write sharing. |
| Get File Metadata | N/A | |
| Delete File | Delete | If file is currently open in SMB, can only delete the file via REST if file is open with Delete sharing. |
| Put Range | Write | If file is currently open in SMB, can only write data against the file via REST if file is open with Write sharing. |
| List Ranges | Read | If file is currently open in SMB, can only list its ranges via REST if the file if file is open with Read sharing. |

TABLE 2

| SMB Client File Sharing Mode | REST File Operations failing with a Sharing Violation |
|---|---|
| None (Deny Read, Write, Delete) | The following read, write, and delete operations on the file will fail: Create File Get File Set File Properties Set File Metadata Delete File Put Range List Ranges |

TABLE 2-continued

| SMB Client File Sharing Mode | REST File Operations failing with a Sharing Violation |
|---|---|
| Shared Read (Deny Write, Delete) | The following write and delete operations on the file will fail: Create File Set File Properties Set File Metadata Delete File Put Range |
| Shared Write (Deny Read, Delete) | The following read and delete operations on the file will fail: Create File. Get File. Delete File. List Ranges. |
| Shared Delete (Deny Read, Write) | The following read and write operations on the file will fail: Create File Get File Set File Properties Set File Metadata Put Range List Ranges |
| Shared Read/Write (Deny Delete) | The following delete operations on the file will fail: Create File. Delete File. |
| Shared Read/Delete (Deny Write) | The following write operations on the file will fail: Create File Set File Properties Set File Metadata Put Range |
| Shared Write/Delete (Deny Read) | The following read operations on the file will fail: Get File List Ranges |
| Shared Read/Write/Delete (Deny Nothing) | Sharing violation errors will not be returned for any file operation. |

As shown above in Table 1., List Files (REST API), Get File Properties (REST API), and Get File Metadata (REST API) do not operate on SMB file content and do not require read access to the file (i.e. these operations will still succeed even if an SMB client has the file open for exclusive read access).

It is further contemplated that depending on the share mode specified when an SMB client opens a file, it is possible for the REST service to return status code 409 (Conflict) with error code Sharing Violation as described in Table 2.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention in one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

The invention claimed is:

1. A system for executing REST-based operations and SFA-based operations in distributed file systems, the system comprising:
one or more hardware processors and computer storage media storing computer-executable instructions and components that, when executed, by the one or more hardware processors, cause the one or more hardware processors to execute:
a Shared File Access-Representational State Transfer (SFA-REST) interface component configured for:
receiving one or more SFA-based operations for files in a distributed file system;
processing the one or more SFA-based operations based on an SFA-REST interface, wherein the SFA-REST interface comprises integrated functionality of an SFA protocol and REST protocol;
receiving one or more REST-based operations for files in the distributed file system;
processing the one or more REST-based operations based on the SFA-REST interface;
executing an SFA-based operation on a first file;
executing an SFA-based operation on a second file; and
executing a REST-based operation on the second file based in part on referencing the currently executing SFA-based operation accessing the second file.

2. The system of claim 1, wherein the SFA interface component further comprises a data access component configured for:
returning a handle corresponding to the first file for the SFA-based operation; and
not returning a handle corresponding to the second file for the REST-based operation.

3. The system of claim 1, wherein the SFA interface component further comprises a lease access component configured for:
granting a REST lease for the second file, wherein the REST lease supports exclusive write shared read access to the second file; and
granting shared access to files based on REST leases or handles of operation modifiers associated with the files, wherein the one or more SFA-based operations include operation modifiers that define a constraint that modifies the one or more SFA-based operations.

4. The system of claim 1, wherein the SFA interface component further comprises a cache component configured for:
identifying an opportunistic lock associated with operation modifiers of the one or more SFA-based operations, wherein the opportunistic lock indicates that a latest state of files is cached on an SFA client associated with the SFA-based operation;
determining to break the opportunistic lock of the SFA-based operation based on referencing the operation modifiers; and
performing an opportunistic lock break operation such that the one or more REST-based operations are executed.

5. The system of claim 1, wherein the SFA interface component further comprises a time stamp component configured for:
generating a plurality of timestamps for files in the distributed file system for both the one or more SFA-based operations and the one or more REST-based operations, wherein the plurality of time stamps include at least an entity tag (ETAG) timestamp and one or more of: a creation time, a last modify time, a last write time, and a last access time, wherein the ETAG timestamp is updated for both the one or more REST-based operations and the one or more SFA-based operations to support optimistic concurrency.

6. The system of claim 1, wherein the SPA interface component further, comprises:
a metadata component configured for providing a restricted name set for metadata corresponding to the one or more SFA-based operations and the one or more REST-based operations; and
a name and referencing component configured for implementing case insensitive and case preserving directory names and file names system.

7. The system of claim 1, wherein the SFA interface component further comprises a byte lock component configured for:
rejecting read operations or write operations through the one or more REST-based operations when a conflict exists with a logic of the one or more SFA-based operations byte range lock, wherein an SFA-based byte range lock defines read and write access to regions of tiles.

8. The system of claim 1, wherein the SFA interface component further comprises a locking component configured for executing locking operation modifiers associated with the one or more SFA-based operations, wherein access to files is processed based on locking operation modifiers of the one or more SFA-based operations.

9. The system of claim 1, further comprising a file service schema comprising a plurality of tables, wherein the plurality of tables store states of files in the distributed file system, and wherein the plurality tables comprise fields corresponding to elements of the SFA-REST interface.

10. The system of claim 1, further comprising a snapshot component configured for:
snapshotting a file share to back-up the contents of the file share, wherein the file share comprises changes to the file share written to the file share using a copy-on-write type pattern such that a previous version at each snapshot can be accessed independently, and wherein snapshotting the file share is based one of:
an atomic snapshot operation comprising a two-pass-notification and write instruction operation;
a non-atomic snapshot operation comprising a single-pass write instruction operation; or
a cross-share atomic snapshot comprising snapshotting multiple file shares.

11. The system of claim 1, further comprising a snapshot component comprising a share table having a schema that represents the files and snapshots of the file share, wherein the share table comprises an entry for the file share and one or more entries for snapshots of the file share.

12. A system for executing REST-based operations and SFA-based operations in distributed file systems, the system comprising: one or more hardware processors and computer storage media storing computer-executable instructions and components that, when executed, by the one or more hardware processors, cause the one or more hardware processors to execute:
a file service schema comprising a plurality of tables, wherein the plurality of tables store states of files in the distributed file system, and wherein the plurality of tables comprise fields corresponding to elements of an a Shared File Access-Representational State Transfer (SFA-REST) interface,
wherein the SFA-REST interface comprises integrated functionality of an SFA protocol and REST protocol for referencing between one or more REST-based operations and one or more SFA-based operations concurrently executing to access files in the file system.

13. The system of claim 12, wherein the file service schema further comprises hierarchical tables for storing files and directories based on corresponding names of the files and directories, wherein files and directories are retrieved using lookups to a namespace table storing a plurality of file identifiers.

14. The system of claim 12, further comprising a namespace table, wherein the name space table is a primary table of the file service schema.

15. The system of claim 12, further comprising a file information table, wherein the file information table stores information about the content of files, wherein the file information table comprises a plurality of timestamps fields for files.

16. The system of claim 12, further comprising a file page range table, wherein the file page range table comprises data associated with files, wherein a key for the table comprises a file identifier and an offset size of a page range stored for a file.

17. The system of claim 12, further comprising a handle table, wherein the handle table comprises one or more open handles for the one or more SFA-REST interface operations.

18. The system of claim 12, further comprising a lease table, wherein the lease table stores leases that are associated with files.

19. The system of claim 12, further comprising a change notify table and a change notify events table, the change notify table is updated upon a registration to detect changes within a directory and the change notify events table is updated upon the occurring of an event that is stored.

20. The system of claim 12, further comprising a byte range lock table, wherein the byte range lock stores locks for files using at least a lock identifier and a handle identifier.

21. A computer-implemented method for executing REST-based operations and SFA-based operations in a distributed file system, the method comprising:
receiving a Shared File Access (SFA)-based operation for a file in a distributed file system from an SFA client, the SFA-based operation having an operation modifier that indicates an opportunistic lock of the SFA-based operation, wherein the SFA-based operation is defined based on a Shared File Access-Representational State Transfer (SFA-REST) interface:
processing the SFA-based operation on the file based on referencing the operation modifier of the SFA-based operation;
receiving a REST-based operation for the file in the distributed file system from a REST client, wherein the REST-based operation is defined based on the SFA-REST interface, wherein the SFA-REST interface comprises integrated functionality of an SFA protocol and REST protocol;
processing the REST-based operation based on the SFA-REST interface;
executing the SFA-based operation on the file; and
executing the REST-based operation on the file based on referencing the operation modifier of the currently executing SFA-based operation.

22. The method of claim 21, wherein executing the REST-based operation on the file based on referencing the operation modifier further comprises:
identifying the opportunistic lock associated with the operation modifier of the SFA-based operation, wherein the opportunistic lock indicates that a latest state of the file is cached on the SFA client associated with the SFA-based operation;
determining to break the opportunistic lock of the SFA-based operation based on referencing the operation modifier; and
performing an opportunistic lock break operation such that the REST-based operation is executed.

23. The method of claim 21, wherein the SFA client acquires the opportunistic lock comprising one or more of:
a read(R), wherein the SFA client reads from a local cache;
a write(W), wherein the client writes locally;
a handle(H), wherein the SFA client does not immediately send a notification when a handle is closed; and
wherein the read(R) opportunistic lock is broken when the REST-based operation is a write operation;
wherein the write(W) opportunistic lock is broken when the REST-based operation is a read operation; and
wherein the handle(H) opportunistic lock is broken when the REST-based operation is a delete operation.

24. The method of claim 23, wherein the handle(H) opportunistic lock is broken when the REST-based operation initiates a sharing violation with the handle(H) of the SFA-based operation, wherein the access mode and the sharing mode of the SFA-based operation are different from the opportunistic lock.

25. The method of claim 23, wherein the opportunistic lock break operation comprises:
flushing one or more cached SMB client changes; and
communicating an operation failed notification for a client cache flush delayed over a specified request timeout.

26. A computer-implemented method for executing REST-based operations and SFA-based operations in a distributed file system, the method comprising:
receiving a Shared File Access (SFA)-based operation for a file in a distributed file system from an SFA client, the SFA-based operation having an operation modifier that indicates an access-shared mode of the SFA-based operation, wherein the SFA-based operation is defined based on a Shared File Access-Representational State Transfer (SFA-REST) interface;
processing the SFA-based operation based on the SFA-REST interface, wherein the SFA-REST interface comprises integrated functionality of an SFA protocol and REST protocol;
executing the SFA-based operation based on the operation modifier;
receiving a REST-based operation for the file in the distributed file system from a REST client;
processing the REST-based operation based on the SFA-REST interface; and
executing the REST-based operation on the file based on referencing the operation modifier of the currently executing SFA-based operation.

27. The method of claim 26, wherein the REST-based operation is a Create File operation, the Create File operation executed only when the access-share mode modifier comprises one of: a write sharing mode, or a write/delete sharing mode.

28. The method of claim 26, wherein the REST-based operation is a Get File operation or List Ranges operation, the Get File operation or List Ranges operation executed only when the share mode modifier comprises a read sharing mode.

29. The method of claim 26, wherein the REST-based operation is a Put Range operation, Set Properties operation or a Set File Metadata operation, the Put Range operation, Set Properties operation or he Set File Metadata operation executed only when the share mode modifier comprises a write sharing mode.

30. The method of claim 26, wherein the REST-based operation is a Delete operation, the Delete operation executed only when the share mode modifier comprises a Delete sharing mode.

31. The method of claim 26, wherein the REST-based operation is a List Files operation, a Get File Properties operation, or a Get File Metadata operation, where the List Files operation, the Get File Properties operation, or the Get File Metadata operation are executed while the file is open with an exclusive read access based on the SFA-based operation having share mode modifier.

32. The method of claim 26, further comprising communicating a sharing violation when the share mode modifier precludes access to the file based on the REST-based operation received.

33. A computer-implemented method for executing REST-based operations and SFA-based operations in a distributed file system, the method comprising:
receiving an operation for a file at a Shared File Access-Representational State Transfer (SFA-REST) interface;
accessing a file service to perform the operation corresponding to the file, the file service comprising a plurality of tables, wherein the plurality of tables store states of files in the distributed file system, and wherein the SFA-REST interface comprises integrated functionality of an SFA protocol and REST protocol for accessing files in the file system;
processing the operation based on SFA-REST interface; and
executing the operation based at least in part on identifying a file state for the file that is stored based on a file service schema of the file service.

34. The method of claim 33, wherein the plurality of tables comprise fields defined in the file service schema corresponding to the SFA-REST interface, the plurality of tables related based on operations defined in the SFA-REST interface for coordinating operation interactions between SFA clients and REST clients.

35. The method of claim 33, wherein the file service schema supports bypassing storing files state in-memory states to storing file states directly on a cloud computing platform store such that a plurality SFA clients and REST clients simultaneously access the file states using the file service schema.

36. The method of claim 33, wherein the file service schema includes a hierarchical table for storing files and directories based on corresponding names of the files and directories, wherein files and directories are retrieved using lookups to a namespace table storing a plurality of file identifiers.

37. A computer-implemented method for executing REST-based operations and SFA-based operations in a distributed file system, the method comprising:
receiving an operation for a file share at a Shared File Access Representational State Transfer (SFA-REST) interface, wherein the SFA-REST interface comprises integrated functionality of an SFA protocol and REST protocol for accessing files in the file system;
accessing a share table to perform the operation corresponding the file share, the share table represents files shares and snapshots of the file shares using semantics of the SFA-REST interface, wherein the share table comprises an entry for a file share and an entry for a snapshot;
processing the operation based on the SFA-REST interface: and
executing the operation based at least in part on identifying a file share state or a snapshot state for the file share stored based on the share table.

38. The method of claim 37, further comprising snapshotting the file share to back-up the contents of the file share, wherein the file share comprises changes to the file share written to the file share using a copy-on-write type pattern such that a previous version at each snapshot can be accessed independently, and wherein snapshotting the file share is based on one of:
an atomic snapshot operation comprising a two-pass-notification and write instruction operation:
a non-atomic snapshot operation comprising a single-pass write instruction operation; or
a cross-share atomic snapshot comprising snapshotting multiple file shares.

39. The method of claim 37, wherein snapshotting the file share is based on one of:
an atomic snapshot operation comprising a two-pass notification and write instruction operation;
a non-atomic snapshot operation comprising a single-pass write instruction operation; or
a cross-share atomic snapshot comprising snapshotting multiple file shares.

40. The method of claim 37, further comprising:
updating the share table comprising the file share, wherein updating the share table comprises adding a row to the share table, the row associated with a new version of the file share;
communicating to a node associated with the file share a notification directing the node to start writing to the new version of the file share;
determining that the node is writing to the new version of the file share; and updating the share table to indicate that the snapshot completed successfully.

* * * * *